(12) United States Patent
Nakamura

(10) Patent No.: US 11,132,852 B2
(45) Date of Patent: Sep. 28, 2021

(54) DIAGNOSIS APPARATUS, DIAGNOSIS SYSTEM, AND DIAGNOSIS METHOD

(71) Applicant: TOYOTA JIDOSHA KABUSHIKI KAISHA, Toyota (JP)

(72) Inventor: Shigeki Nakamura, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 235 days.

(21) Appl. No.: 16/369,623

(22) Filed: Mar. 29, 2019

(65) Prior Publication Data

US 2019/0340848 A1 Nov. 7, 2019

(30) Foreign Application Priority Data

May 7, 2018 (JP) .............................. JP2018-089495

(51) Int. Cl.
*G07C 5/08* (2006.01)
*G07C 5/00* (2006.01)
*H04W 4/46* (2018.01)

(52) U.S. Cl.
CPC ........... *G07C 5/0808* (2013.01); *G07C 5/008* (2013.01); *H04W 4/46* (2018.02)

(58) Field of Classification Search
CPC ....... G07C 5/0808; G07C 5/008; H04W 4/46; G01M 17/007; G05B 23/0208
See application file for complete search history.

(56) References Cited

U.S. PATENT DOCUMENTS

2017/0352201 A1* 12/2017 Kumabe ................ G07C 5/008

FOREIGN PATENT DOCUMENTS

| CN | 107111935 A | 8/2017 |
|---|---|---|
| JP | 2011-185727 A | 9/2011 |
| JP | 2013-008111 A | 1/2013 |
| JP | 2016-128985 A | 7/2016 |

* cited by examiner

*Primary Examiner* — Michael V Kerrigan
(74) *Attorney, Agent, or Firm* — Oliff PLC

(57) ABSTRACT

A diagnosis apparatus includes a detection value and appropriate value acquisition unit configured to acquire a detection value of first equipment mounted in a first vehicle and an appropriate value of the detection value of the first equipment, an appropriate value estimation unit configured to estimate an appropriate value of a detection value of second equipment mounted in at least one second vehicle within a predetermined range from the first vehicle based on the detection value of the first equipment and the appropriate value of the detection value of the first equipment, and a diagnosis unit configured to compare the detection value of the second equipment with the appropriate value of the detection value of the second equipment to perform diagnosis of an operation state of the second equipment.

6 Claims, 9 Drawing Sheets

DIAGNOSIS APPARATUS, DIAGNOSIS SYSTEM, AND DIAGNOSIS METHOD

INCORPORATION BY REFERENCE

The disclosure of Japanese Patent Application No. 2018-089495 filed on May 7, 2018 including the specification, drawings and abstract is incorporated herein by reference in its entirety.

BACKGROUND

1. Technical Field

The present disclosure relates to a diagnosis apparatus, a diagnosis system, and a diagnosis method that diagnose a sensor mounted in a vehicle.

2. Description of Related Art

A technique for diagnosing an abnormality sign of equipment has been developed. For example, Japanese Unexamined Patent Application Publication No. 2013-008111 (JP 2013-008111 A) discloses an abnormality sign diagnosis apparatus. The abnormality sign diagnosis apparatus includes first diagnosis means for diagnosing the presence or absence of an abnormality sign on diagnosis target data based on a degree of deviation (degree of abnormality) from a case model created with, as learning data, sensor data when machinery is operating normally, and second diagnosis means for diagnosing the presence or absence of the abnormality sign based on whether or not a value of individual sensor data is within a predetermined range determined in advance. When the first diagnosis means diagnoses that the abnormality sign is present, the individual sensor data referred to for the abnormality sign diagnosis of the second diagnosis means is selected based on a degree of contribution indicating the magnitude of contribution to the degree of abnormality.

Japanese Unexamined Patent Application Publication No. 2011-185727 (JP 2011-185727 A) discloses a vehicle diagnosis system in which a vehicle diagnosis apparatus receives, from a diagnosis target vehicle, a state value showing an operation state of in-vehicle equipment mounted in the vehicle through wireless communication, and determines whether or not the received state value is within a normal range in a distribution of state values acquired by the vehicle at the time of a normal operation of the in-vehicle equipment, thereby diagnosing the vehicle as a transmission source of the state value.

According to the techniques described in JP 2013-008111 A and JP 2011-185727 A, data at the time of a normal operation of diagnosis target equipment is needed. However, a value at the time of the normal operation of the equipment mounted in the vehicle is changeable due to an external environment, such as a road surface shape of a road on which the vehicle is traveling, a gradient of the road, or weather. Accordingly, Japanese Unexamined Patent Application Publication No. 2016-128985 (JP 2016-128985 A) discloses a technique that transmits and receives data indicating an operation situation of a sensor mounted in a vehicle to and from peripheral vehicles through vehicle-to-vehicle communication and diagnoses whether or not the sensor is operating normally.

SUMMARY

According to the technique described in JP 2016-128985 A, since it is possible to acquire index data taking an influence of the external environment into consideration through the vehicle-to-vehicle communication, there is no need to separately acquire information relating to the external environment, and it is possible to restrain labor for software design or an increase in cost. However, a detection value of the sensor may be different due to a factor other than the external environment depending on the type of sensor even under the same external environment, and in this case, it is difficult to correctly perform diagnosis of the abnormality sign of the sensor.

The present disclosure provides a diagnosis apparatus, a diagnosis system, and a diagnosis method capable of performing diagnosis of equipment mounted in a vehicle with high accuracy.

A first aspect of the present disclosure relates to a diagnosis apparatus. The diagnosis apparatus includes a detection value and appropriate value acquisition unit, an appropriate value estimation unit, and a diagnosis unit. The detection value and appropriate value acquisition unit is configured to acquire a detection value of first equipment mounted in a first vehicle and an appropriate value of the detection value of the first equipment. The appropriate value estimation unit is configured to estimate an appropriate value of a detection value of second equipment mounted in at least one second vehicle within a predetermined range from the first vehicle based on the detection value of the first equipment and the appropriate value of the detection value of the first equipment. The diagnosis unit is configured to compare the detection value of the second equipment with the appropriate value of the detection value of the second equipment to perform diagnosis of an operation state of the second equipment.

In the diagnosis apparatus according to the above-described first aspect, the appropriate value estimation unit may be configured to compare the detection value of the first equipment with the appropriate value of the detection value of the first equipment to calculate a confidence coefficient of the first equipment. The appropriate value estimation unit may be configured to estimate the appropriate value of the detection value of the second equipment based on the confidence coefficient of the first equipment and the detection value of the first equipment.

In the diagnosis apparatus according to the above-described first aspect, the detection value and appropriate value acquisition unit may be configured to acquire positional information at the time of detection of the detection value of the first equipment and at the time of calculation of the appropriate value of the detection value of the first equipment. The appropriate value estimation unit may be configured to estimate the appropriate value of the detection value of the second equipment based on the detection value of the first equipment, the appropriate value of the detection value of the first equipment, and the positional information.

In the diagnosis apparatus according to the above-described first aspect, the diagnosis unit may be configured to, when the number of first vehicles is equal to or less than a threshold, perform the diagnosis.

In the diagnosis apparatus according to the above-described first aspect, the diagnosis apparatus may be positioned outside the first vehicle and the second vehicle.

A second aspect of the present disclosure relates to a diagnosis system. The diagnosis system includes a vehicle and a server. The vehicle is mounted with a diagnosis apparatus. The server is configured to perform communication with the vehicle. The diagnosis apparatus includes a detection value and appropriate value acquisition unit, an appropriate value estimation unit, and a diagnosis unit. The detection value and appropriate value acquisition unit is configured to acquire a detection value of first equipment mounted in a first vehicle and an appropriate value of the detection value of the first equipment. The appropriate value estimation unit is configured to estimate an appropriate value of a detection value of second equipment mounted in at least one second vehicle within a predetermined range from the first vehicle based on the detection value of the first equipment and the appropriate value of the detection value of the first equipment. The diagnosis unit is configured to compare the detection value of the second equipment with the appropriate value of the detection value of the second equipment to perform diagnosis of an operation state of the second equipment. The detection value and appropriate value acquisition unit acquires the detection value of the first equipment and the appropriate value of the detection value of the first equipment through vehicle-to-vehicle communication solely when the vehicle fails in communication with the server.

A third aspect of the present disclosure relates to a diagnosis method. The diagnosis method includes acquiring a detection value of first equipment mounted in a first vehicle and an appropriate value of the detection value of the first equipment, estimating an appropriate value of a detection value of second equipment mounted in at least one second vehicle within a predetermined range from the first vehicle based on the detection value of the first equipment and the appropriate value of the detection value of the first equipment, and comparing the detection value of the second equipment with the appropriate value of the detection value of the second equipment to diagnose an operation state of the second equipment.

According to the aspects of the present disclosure, it is possible to perform diagnosis of equipment mounted in a vehicle with high accuracy.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
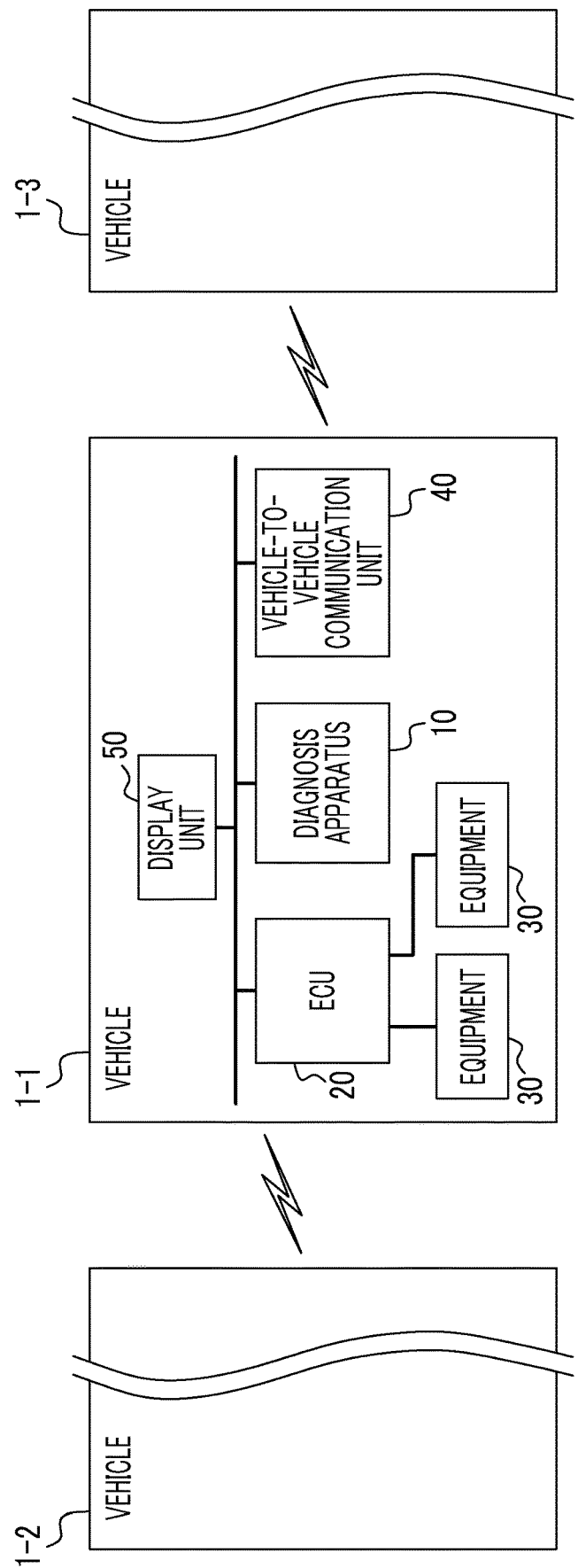
FIG. 1 is a diagram showing the schematic configuration of a vehicle including a diagnosis apparatus according to a first embodiment of the present disclosure.

Hereinafter, embodiments of the present disclosure will be described in detail referring to the drawings.

First Embodiment

FIG. 1 is a diagram showing the schematic configuration of a vehicle including a diagnosis apparatus according to a first embodiment. Each vehicle 1 includes a diagnosis apparatus 10, an electronic control unit (ECU) 20, equipment 30, a vehicle-to-vehicle communication unit 40, and a display unit 50. For convenience of description, solely three vehicles 1-1, 1-2, 1-3 having the same configuration are shown in FIG. 1, and in the first embodiment, the vehicle 1-1 will be described as a host vehicle (an example of a second vehicle), and the vehicle 1-2 and the vehicle 1-3 will be described as peripheral vehicles (an example of a first vehicle) within a predetermined range from the vehicle 1-1. Here, the predetermined range is, for example, a range in which vehicle-to-vehicle communication is possible.

Since a sensor is deteriorated over time, a detection value of the sensor may gradually deviate from a normal value, and then, a control value of an actuator based on the detection value of the sensor deviates from a normal value. Accordingly, in the embodiments of the present disclosure, the detection value of the sensor or the control value of the actuator is monitored, and diagnosis of the sensor is performed.

Equipment 30 is a sensor or an actuator, and a detection value of the equipment 30 means a detection value (sensor value) of the sensor or a control value of the actuator. Hereinafter, in an embodiment of the present specification, the equipment 30 will be described as a sensor 30. In the vehicle 1, various sensors 30, such as an outside air temperature sensor, an intake air temperature sensor, a coolant temperature sensor, a vehicle speed sensor, an $O_2$ sensor, a steering sensor, an air pressure sensor, an ultrasonic sensor, a gyro sensor, and an obstacles sensor, are mounted. A detection value of the sensor 30 is output to an ECU 20 that performs processing using the detection value.

A plurality of ECUs 20 is mounted in the vehicle 1 and performs electronic control of various operations of the vehicle 1. For example, an engine ECU 20 drives an actuator based on information of the sensor 30, such as the intake air temperature sensor, the coolant temperature sensor, the vehicle speed sensor, or the $O_2$ sensor, and controls a fuel injection amount or injection time of the engine.

A vehicle-to-vehicle communication unit 40 performs direct communication (vehicle-to-vehicle communication) between the vehicles 1 using an electric wave in a frequency bandwidth allocated in advance, receives detection information of the sensors 30 (first equipment) mounted in the peripheral vehicles 1-2, 1-3 from the peripheral vehicles 1-2, 1-3, and demodulates the detection information. The vehicle-to-vehicle communication unit 40 modulates detection information of the sensor 30 (second equipment) mounted in the host vehicle 1-1 and transmits the modulated detection information to the peripheral vehicles 1-2, 1-3. The vehicle-to-vehicle communication unit 40 can perform communication with the peripheral vehicles within a range in which an electric wave reaches, and the range in which an electric wave reaches can be appropriately adjusted by adjusting electric wave intensity. The vehicle-to-vehicle communication unit 40 outputs the received detection information to a diagnosis apparatus 10. While a frequency with which the vehicle-to-vehicle communication unit 40 transmits and receives the detection information is optional, in order to restrain any number of times of communication with the same vehicle, when communication is performed with the same vehicle once, communication may not be performed until a predetermined period elapses.

The diagnosis apparatus 10 determines whether or not an abnormality, such as failure, occurs in the sensor 30 mounted in the host vehicle 1-1 based on the detection information received by the vehicle-to-vehicle communication unit 40 through the vehicle-to-vehicle communication.

A display unit 50 is, for example, a panel display, a head-up display, or the like, and displays a diagnosis result of the diagnosis apparatus 10, or the like.

Figure 2:
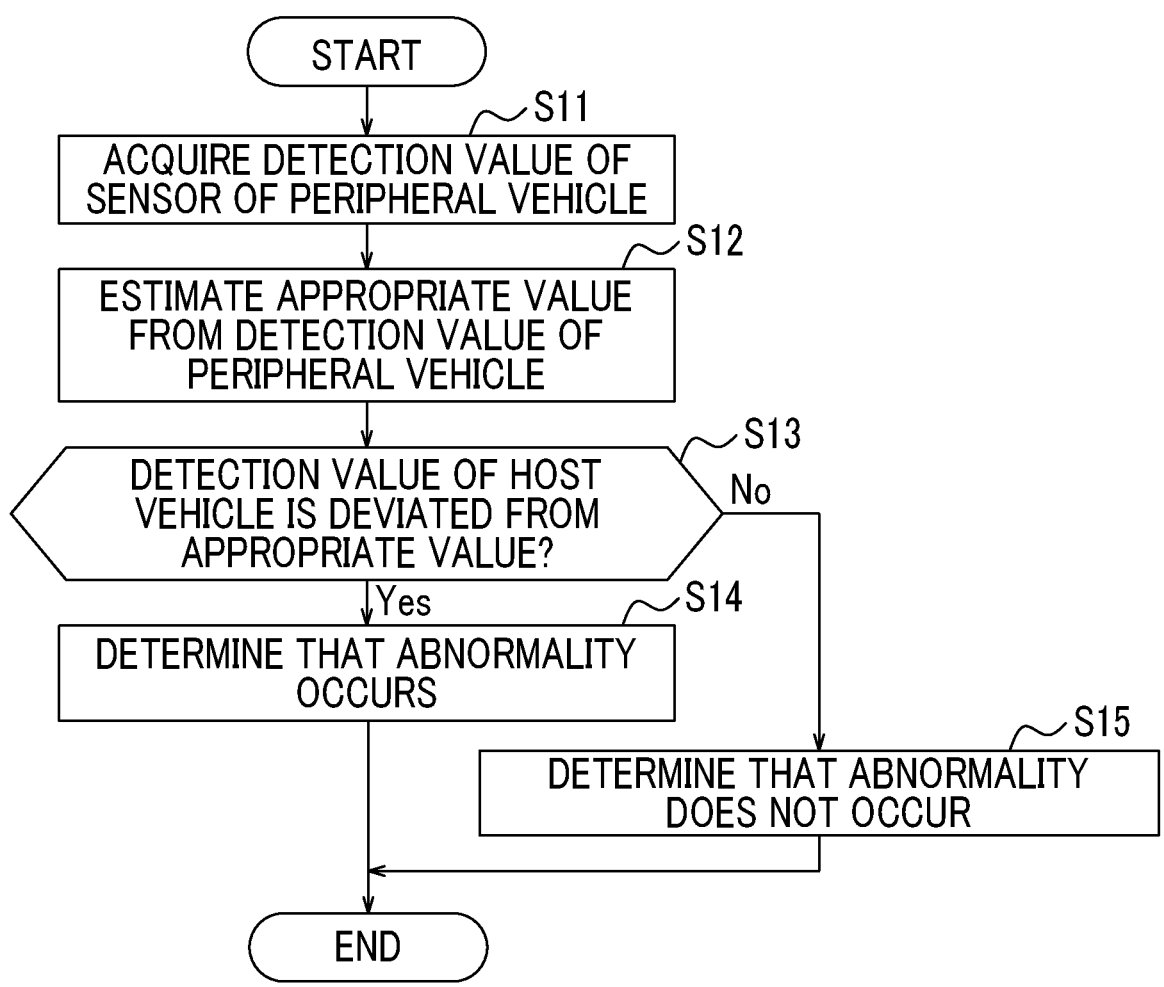
FIG. 2 is a flowchart showing an example of a procedure of a diagnosis method using the diagnosis apparatus according to the first embodiment of the present disclosure.

The outline is described referring to FIG. 2, and then, processing contents of the diagnosis apparatus 10 will be described in more detail referring to FIGS. 3 and 4. FIG. 2 is a flowchart showing an example of a procedure of a diagnosis method using the diagnosis apparatus 10.

The diagnosis apparatus 10 acquires the detection values of the sensors 30 mounted in the peripheral vehicles 1-2, 1-3 from the detection information obtained through the vehicle-to-vehicle communication (Step S11). Next, the diagnosis apparatus 10 estimates appropriate values (hereinafter, simply referred to as "appropriate values") of the detection values from the detection values of the peripheral vehicles 1-2, 1-3 (Step S12). A specific example of the estimation will be described below. Then, the diagnosis apparatus 10 compares the detection values of the host vehicle 1-1 with the estimated appropriate values (Step S13), when both values deviate (Step S13—Yes), determines that an abnormality occurs in the sensor 30 mounted in the host vehicle 1-1 (Step S14), and when both values do not deviate (Step S13—No), determines that an abnormality does not occur in the sensor 30 mounted in the host vehicle 1-1 (Step S15).

Figure 3:
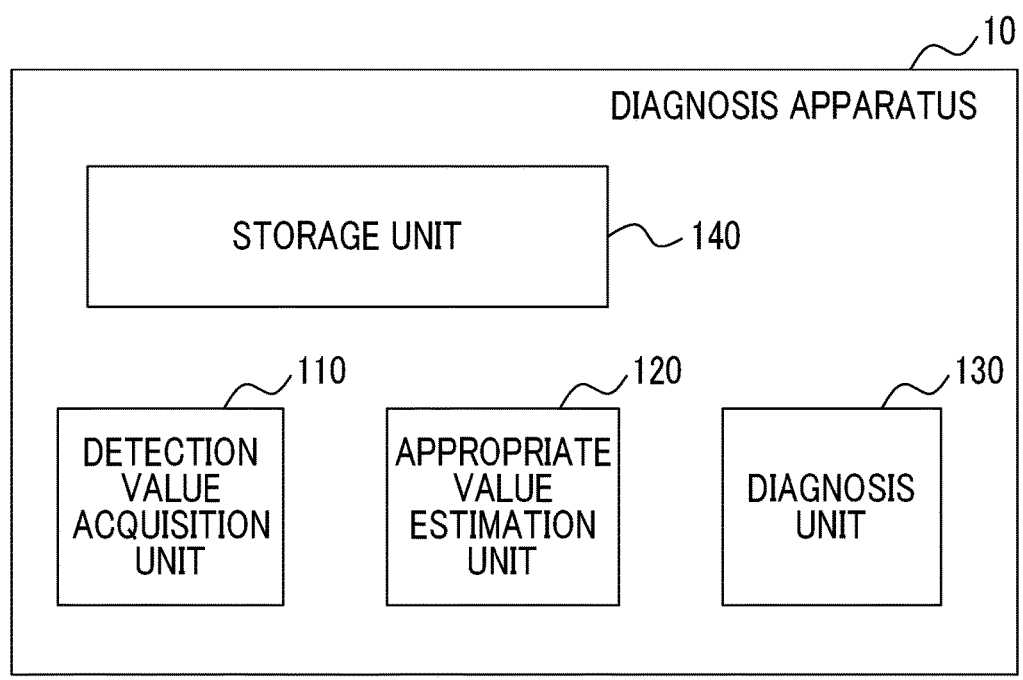
FIG. 3 is a diagram showing a configuration example of the diagnosis apparatus according to the first embodiment of the present disclosure.

FIG. 3 is a diagram showing a configuration example of the diagnosis apparatus 10. The diagnosis apparatus 10 shown in FIG. 3 includes a detection value acquisition unit 110, an appropriate value estimation unit 120, a diagnosis unit 130, and a storage unit 140.

The detection value acquisition unit 110 performs the processing of Step S11 described above. That is, the detection value acquisition unit 110 instructs the vehicle-to-vehicle communication unit 40 to receive the detection information of the peripheral vehicles 1-2, 1-3 through the vehicle-to-vehicle communication. Then, the detection value acquisition unit 110 acquires the detection values of the sensors 30 mounted in the peripheral vehicles 1-2, 1-3 from the detection information received by the vehicle-to-vehicle communication unit 40 and outputs the acquired detection values to the storage unit 140.

The appropriate value estimation unit 120 performs the processing of Step S12 described above. That is, the appropriate value estimation unit 120 estimates the appropriate values based on the detection values stored in the storage unit 140 and outputs the estimated appropriate values to the diagnosis unit 130. For example, the appropriate value estimation unit 120 sets an average value of a detection value $x_1$ acquired from the peripheral vehicle 1-2 and a detection value $x_2$ acquired from the peripheral vehicle 1-3 as an appropriate value $\hat{x}$ of the sensor 30 mounted in the host vehicle 1-1.

Alternatively, the appropriate value estimation unit 120 may perform weighting according to a difference in form, environment, or the like between the host vehicle 1-1 and the peripheral vehicles 1-2, 1-3 and may estimate the appropriate value $\hat{x}$ through weighted average shown in Expression (1). Here, $w_1$ is a weight of the detection value $x_1$, and $w_2$ is a weight of the detection value $x_2$. When weighting is performed, it is assumed that information (for example, vehicle type information) needed for deciding weighting is included in the detection information, and the storage unit 140 stores a weight according to a vehicle type in advance.

$$\hat{x} = \frac{x_1 w_1 + x_2 w_2}{w_1 + w_2} \qquad (1)$$

Although the sensor 30 is a sensor, such as the outside air temperature sensor, that is hardly affected by a factor other than the external environment, a sensor, such as a sensor that detects air pressure of a tire or a sensor that detects a rotation speed of an engine, that has a different detection value for each vehicle type even though the external environment is the same is also known. When the detection value of the sensor is different for each vehicle type, it is desirable to perform weighting according to the vehicle type to correct the detection value. For this reason, the appropriate value estimation unit 120 substitutes the detection values $x_1$, $x_2$ into a first arithmetic expression without using a weight or a second arithmetic expression using a weight shown in Expression (1) according to the type of sensor 30 (according to whether or not the sensor 30 is affected by a factor other than the external environment) related to the detection information, thereby estimating the appropriate value $\hat{x}$ of the sensor 30 mounted in the host vehicle 1-1.

When a range in which the vehicle-to-vehicle communication is performed is widened, vehicles in different external environments (driving conditions), such as a vehicle that is traveling on a smooth road, a vehicle that is traveling on an upward slope, and a vehicle that is traveling on a downward slope, may be included. It is considered that, when the distance between the vehicles is closer, there is a higher possibility that a traveling environment is similar between the vehicles, and when the distance between the vehicles is farther, there is a higher possibility that a traveling environment is different between the vehicles. Accordingly, the appropriate value estimation unit 120 may perform weighting according to the distances between the host vehicle 1-1 and the peripheral vehicles 1-2, 1-3, and may estimate the appropriate value $\hat{x}$. The distance between the vehicles may be obtained, for example, based on positional information to be obtained by a global positioning system (GPS) and to be included in the detection information or may be obtained based on the electric wave intensity in the vehicle-to-vehicle communication.

It is considered that the detection value has a high confidence coefficient when an elapsed time from the end of repair or inspection (vehicle inspection) based on a motor vehicle inspection and registration system ends until the present is shorter, and has a low confidence coefficient when the elapsed time from the end of repair or inspection until the present is longer. Accordingly, the appropriate value estimation unit 120 may perform weighting according to the elapsed time from the end of repair or inspection of the peripheral vehicles 1-2, 1-3 until the present and may estimate the appropriate value x^. The elapsed time from repair or inspection may be obtained based on, for example, history information of repair or inspection to be included in the detection information.

It is considered that, when a vehicle is tracking traveling another vehicle while maintaining an appropriate inter-vehicle distance within a speed set in advance under the control of a radar cruise control or the like, there is a high possibility that a traveling environment is similar between the vehicles during tracking traveling. Accordingly, the appropriate value estimation unit 120 may set a weight of a detection value acquired from a peripheral vehicle that performs tracking traveling with the host vehicle 1-1 to be greater than a weight of a detection value acquired from a peripheral vehicle that does not perform tracking traveling with the host vehicle 1-1 and may estimate the appropriate value x^.

The diagnosis unit 130 performs the processing of Steps S13 to S15 described above. That is, the diagnosis unit 130 compares the detection value of the host vehicle 1-1 with the appropriate value x^ input from the appropriate value estimation unit 120 for each sensor 30, when the difference between both values exceeds a threshold set in advance (when the detection value of the host vehicle 1-1 deviates from the appropriate value x^), determines that an abnormality occurs in the sensor 30, and when the difference between both values is equal to or less than the threshold (when the detection value of the host vehicle 1-1 does not deviate from the appropriate value x^), determines that an abnormality does not occur in the sensor 30. The diagnosis unit 130 outputs a diagnosis result to the display unit 50, a speaker, an external server, or the like. When the diagnosis unit 130 determines that an abnormality occurs in the sensor 30 of the host vehicle 1-1, the diagnosis unit 130 may not transmit the detection information of the sensor 30 to the peripheral vehicles 1-2, 1-3.

Figure 4:
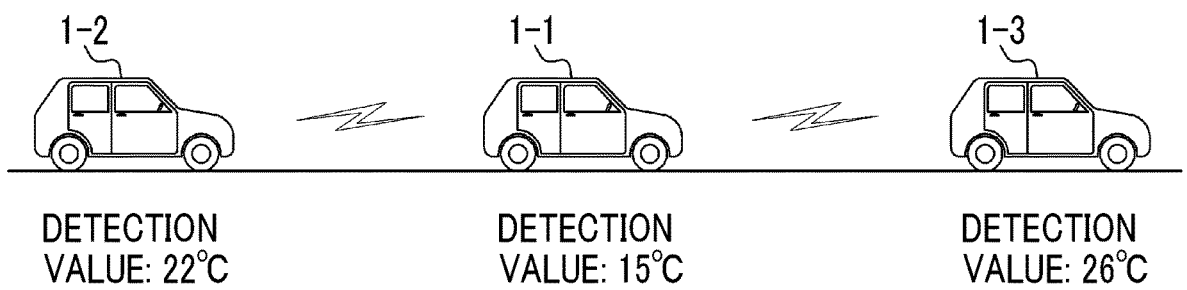
FIG. 4 is a diagram illustrating a diagnosis example of the diagnosis apparatus according to the first embodiment of the present disclosure.

FIG. 4 is a diagram illustrating a specific example of diagnosis of a detection value in the diagnosis apparatus 10. Here, it is assumed that the detection value of the outside air temperature sensor 30 is to be diagnosed, the detection value of the outside air temperature sensor 30 of the host vehicle 1-1 is "15° C.", the detection value of the outside air temperature sensor 30 of the peripheral vehicle 1-2 is "22° C.", and the detection value of the outside air temperature sensor 30 of the peripheral vehicle 1-3 is "26° C."

The detection value acquisition unit 110 of the host vehicle 1-1 acquires the detection value "22° C." of the outside air temperature sensor 30 of the peripheral vehicle 1-2 through the vehicle-to-vehicle communication with the peripheral vehicle 1-2, and acquires the detection value "26° C." of the outside air temperature sensor 30 of the peripheral vehicle 1-3 through the vehicle-to-vehicle communication with the peripheral vehicle 1-3.

Since the outside air temperature sensor 30 is a sensor that is hardly affected by the difference between the vehicles, and the appropriate value estimation unit 120 of the host vehicle 1-1 decides an appropriate value of the outside air temperature sensor 30 to "24° C." as an average value of "22° C." and "26° C.". The diagnosis unit 130 of the host vehicle 1-1 compares the appropriate value "24° C." of the outside air temperature sensor 30 with the detection value "15° C." of the outside air temperature sensor 30 of the host vehicle 1-1. Since the difference of both values is "9° C.", for example, when the threshold is "5° C.", the diagnosis unit 130 determines that an abnormality occurs in the outside air temperature sensor 30.

In this way, with the diagnosis apparatus 10 according to the first embodiment and the diagnosis method thereof, the detection values of the peripheral vehicles 1-2, 1-3 are acquired, and the appropriate value of the detection value of the sensor 30 mounted in the host vehicle 1-1 within the predetermined range from the peripheral vehicles 1-2, 1-3 is estimated using the acquired detection values. In other words, the detection values of the peripheral vehicles 1-2, 1-3 within the predetermined range from the host vehicle 1-1 are acquired, and the appropriate value of the detection value of the sensor 30 mounted in the host vehicle 1-1 is estimated using the acquired detection values. Then, the detection value and the appropriate value of the host vehicle 1-1 are compared with each other, and an operation state of the sensor 30 mounted in the host vehicle 1-1 is diagnosed. In estimating the appropriate value of the detection value of the sensor 30 mounted in the host vehicle 1-1, the first arithmetic operation without using a weight or the second arithmetic operation using a weight is performed according to the type of sensor 30. For this reason, according to the first embodiment of the present disclosure, it is possible to correctly estimate the appropriate value even though the sensor 30 is a sensor that is hardly affected by a factor other than the external environment, and to perform the diagnosis of the sensor 30 mounted in the host vehicle 1-1 with high accuracy.

For example, weighting is performed to the detection values of the peripheral vehicles 1-2, 1-3 according to the vehicle types of the peripheral vehicles 1-2, 1-3, the elapsed time from the end of repair or inspection of the peripheral vehicles 1-2, 1-3 until the present, or the distances between the host vehicle 1-1 and the peripheral vehicles 1-2, 1-3, and the appropriate value of the sensor 30 mounted in the host vehicle 1-1 is estimated, whereby it is possible to perform diagnosis with high accuracy.

The average value of the detection values is calculated by the first arithmetic operation, and the weighted average of the detection values is calculated by the second arithmetic operation, whereby it is possible to estimate the appropriate value with high accuracy by a simple arithmetic operation with a less calculation load.

Second Embodiment

Next, a diagnosis apparatus 11 according to a second embodiment will be described. In the diagnosis apparatus 10 of the first embodiment, when the detection values can be acquired from many peripheral vehicles through the vehicle-to-vehicle communication, it is possible to perform diagnosis with high accuracy; however, when the number of peripheral vehicles is small, there is a possibility that accuracy of diagnosis is degraded. Here, it is considered that detection information of a vehicle within a communication range of a peripheral vehicle and a vehicle outside a communication range of the host vehicle is received using an ad hoc network or a transfer function of vehicle-to-vehicle communication by way of the peripheral vehicle. However, in the above-described method, since the amount of communication increases, a bandwidth for use in communication is strained.

Accordingly, the second embodiment is to perform diagnosis with high accuracy without increasing the amount of communication even though the number of peripheral vehicles is small. Even in the second embodiment, as in the first embodiment, the vehicle 1-1 will be described as a host vehicle, and the vehicle 1-2 and the vehicle 1-3 will be described as peripheral vehicles.

The vehicle-to-vehicle communication unit 40 transmits and receives detection information through vehicle-to-vehicle communication. Although the detection information is information including the detection value of the sensor 30 in the first embodiment, in the second embodiment, it is assumed that the detection information is information including the detection value and the appropriate value of the sensor 30.

The diagnosis apparatus 11 determines whether or not an abnormality occurs in the sensor 30 mounted in the host vehicle 1-1 based on the detection information received by the vehicle-to-vehicle communication unit 40 through the vehicle-to-vehicle communication.

Figure 5:
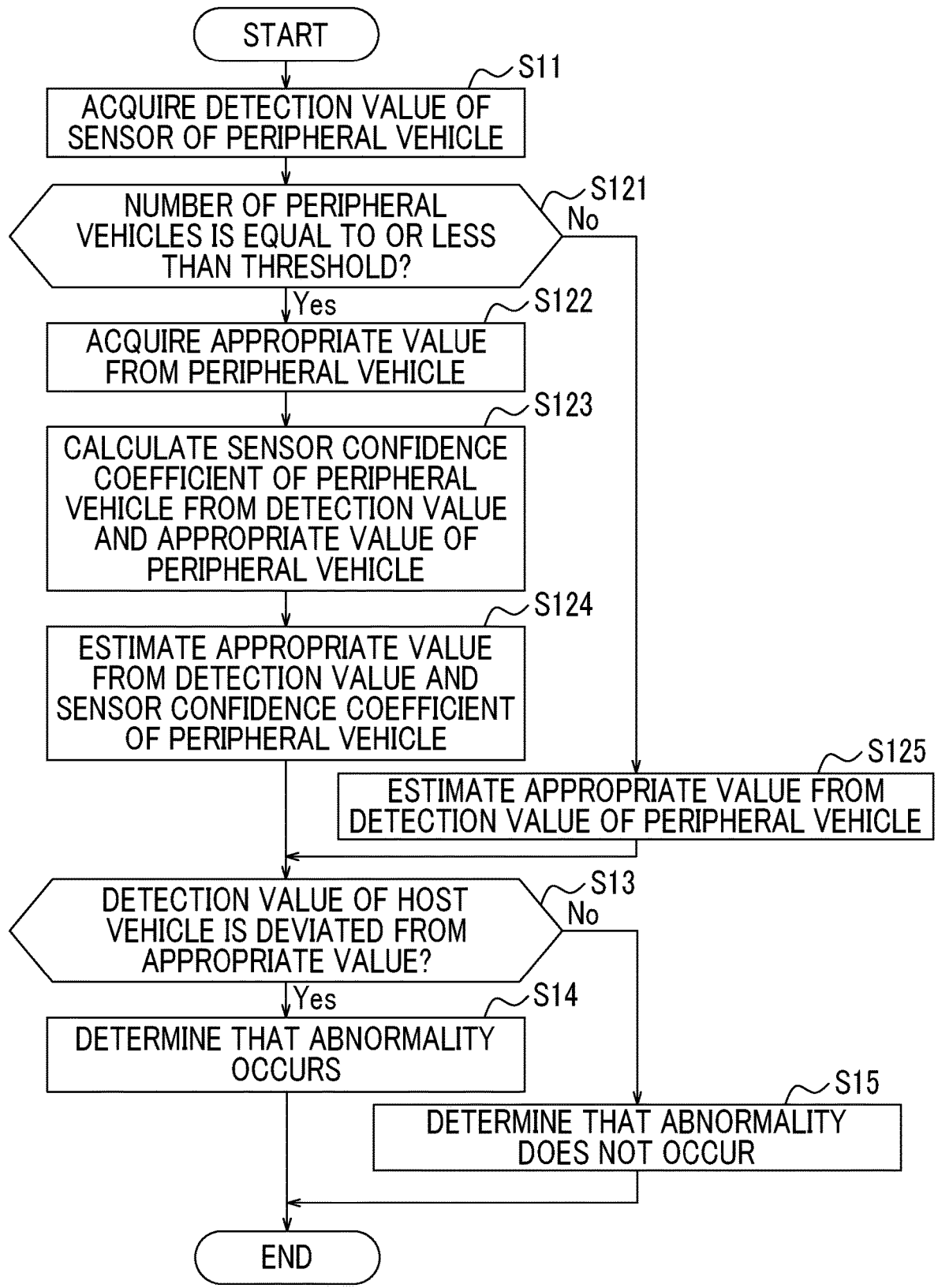
FIG. 5 is a flowchart showing an example of an estimation procedure of an appropriate value in a diagnosis apparatus according to a second embodiment of the present disclosure.

The outline will be described referring to FIG. 5, and then, processing contents of the diagnosis apparatus 11 will be described in more detail referring to FIGS. 6 and 7. FIG. 5 is a flowchart showing an example of a procedure of a diagnosis method using the diagnosis apparatus 11.

The diagnosis apparatus 11 acquires the detection values of the sensors 30 mounted in the peripheral vehicles 1-2, 1-3 from the detection information obtained through the vehicle-to-vehicle communication (Step S11). Next, the diagnosis apparatus 11 determines whether or not the number of peripheral vehicles 1-2, 1-3 is equal to or less than a threshold (Step S121). When the number of peripheral vehicles 1-2, 1-3 exceeds the threshold (Step S121—No), the appropriate value is estimated from the detection values of the peripheral vehicles 1-2, 1-3 through the same processing as in the first embodiment (Step S125).

When the number of peripheral vehicles 1-2, 1-3 is equal to or less than the threshold (Step S121—Yes), the diagnosis apparatus 11 acquires the appropriate values of the peripheral vehicles 1-2, 1-3 (Step S122). Then, the diagnosis apparatus 11 calculates confidence coefficient s (hereinafter, referred to as "sensor confidence coefficient s") of the sensors 30 mounted in the peripheral vehicles 1-2, 1-3 from the detection values and the appropriate values of the peripheral vehicles 1-2, 1-3 (Step S123). Then, the diagnosis apparatus 11 estimates the appropriate value of the sensor 30 mounted in the host vehicle 1-1 from the detection values and the sensor confidence coefficient s of the peripheral vehicles 1-2, 1-3 (Step S124).

Then, the diagnosis apparatus 11 compares the detection values of the host vehicle 1-1 with the estimated appropriate values (Step S13), when both values deviate (Step S13—Yes), determines that an abnormality occurs in the sensor 30 mounted in the host vehicle 1-1 (Step S14), and when both values do not deviate (Step S13—No), determines that an abnormality does not occur in the sensor 30 mounted in the host vehicle 1-1 (Step S15).

The diagnosis apparatus 11 may not perform the processing of Step S123 and may estimate the appropriate value of the sensor 30 mounted in the host vehicle 1-1 from the detection values and the appropriate values of the peripheral vehicles 1-2, 1-3 in Step S124.

The diagnosis apparatus 11 may not perform the processing of Steps S121 and S125, when the detection values of the peripheral vehicles 1-2, 1-3 are acquired (Step S11), may constantly acquire the appropriate values of the peripheral vehicles 1-2, 1-3 (Step S122), may calculate the sensor confidence coefficients of the peripheral vehicles 1-2, 1-3 from the detection values and the appropriate values of the peripheral vehicles 1-2, 1-3 (Step S123), and may estimate the appropriate value of the host vehicle 1-1 from the detection values and the sensor confidence coefficient s of the peripheral vehicles 1-2, 1-3 (Step S124).

Figure 6:
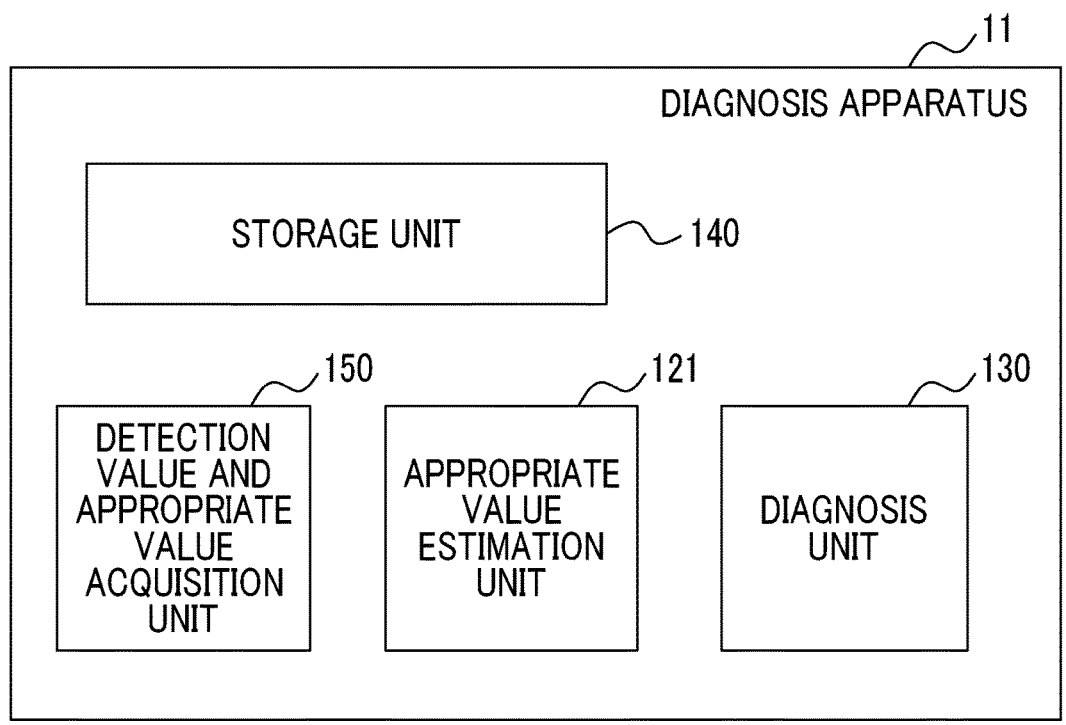
FIG. 6 is a diagram showing the schematic configuration of the diagnosis apparatus according to the second embodiment of the present disclosure.

FIG. 6 is a diagram showing the schematic configuration of the diagnosis apparatus 11. The diagnosis apparatus 11 shown in FIG. 6 includes a detection value and appropriate value acquisition unit 150, an appropriate value estimation unit 121, a diagnosis unit 130, and a storage unit 140.

The detection value and appropriate value acquisition unit 150 performs the processing of Steps S11, S121, and S122 described above. That is, the detection value and appropriate value acquisition unit 150 receives the detection information received by the vehicle-to-vehicle communication unit 40 through the vehicle-to-vehicle communication as input, acquires the detection values of the peripheral vehicles 1-2, 1-3 from the detection information, and when the number of peripheral vehicles 1-2, 1-3 is equal to or less than the threshold, also acquires the appropriate values of the peripheral vehicles 1-2, 1-3. Then, the acquired detection values and appropriate values are output to the storage unit 140.

The appropriate value estimation unit 121 performs the processing of Steps S123 to S125 described above. In the second embodiment, since the number of peripheral vehicles 1-2, 1-3 is two, for example, when the threshold in Step S121 is five, the appropriate value estimation unit 121 estimates the appropriate value through the processing of Steps S123 and S124.

In Step S123, the appropriate value estimation unit 121 compares the detection values and the appropriate values of the peripheral vehicles 1-2, 1-3 stored in the storage unit 140, thereby calculating the sensor confidence coefficient s of the peripheral vehicles 1-2, 1-3. That is, the appropriate value estimation unit 121 calculates a sensor confidence coefficient $s_1$ of the peripheral vehicle 1-2 based on comparison of a detection value $x_1$ and an appropriate value $y_1$ acquired from the peripheral vehicle 1-2, and calculates a sensor confidence coefficient $s_2$ of the peripheral vehicle 1-3 based on comparison of a detection value $x_2$ and an appropriate value $y_2$ acquired from the peripheral vehicle 1-3. The sensor confidence coefficients are set to be higher when index values of the differences between the detection values and the appropriate values of the peripheral vehicles 1-2, 1-3 are smaller. Here, the index value of the difference is an absolute value of the difference between the detection value and the appropriate value, a ratio of the detection value to the absolute value of the difference between the detection value and the appropriate value, or the like. Then, appropriate value estimation unit 121 obtains a weight (a weight having a positive relationship with the sensor confidence coefficient $s_1$) $w_{s1}$ according to the sensor confidence coefficient $s_1$ and a weight $w_{s2}$ according to the sensor confidence coefficient $s_2$, and estimates the appropriate value $\hat{x}$ of the host vehicle 1-1 through weighted average shown in Expression (2).

$$\hat{x} = \frac{x_1 w_{s1} + x_2 w_{s2}}{w_{s1} + w_{s2}} \quad (2)$$

As in the first embodiment, the appropriate value estimation unit 121 may perform weighting of the weights $w_1$, $w_2$ to the detection value $x_1$ and the detection value $x_2$, respectively, and may estimate the appropriate value $\hat{x}$ through weighted average shown in Expression (3).

$$\hat{x} = \frac{x_1 w_1 w_{s1} + x_2 w_2 w_{s2}}{w_1 w_{s1} + w_2 w_{s2}} \quad (3)$$

The detection value and appropriate value acquisition unit 150 may acquire positional information at the time of detection of the detection values of the sensors 30 mounted in the peripheral vehicles 1-2, 1-3 and at the time of calculation of the appropriate values from the peripheral vehicles 1-2, 1-3, and the appropriate value estimation unit 121 may estimate the appropriate value $\hat{x}$ based on the detection values and the appropriate values of the sensors 30 mounted in the peripheral vehicles 1-2, 1-3, and the positional information. For example, when the peripheral vehicles 1-2, 1-3 are different in traveling direction from the host vehicle 1-1, the weights of the detection values decrease or are not used in an arithmetic operation, whereby it is possible to improve the accuracy of the appropriate value $\hat{x}$.

The appropriate value estimation unit 121 estimates the appropriate value through the same processing as in the appropriate value estimation unit 120 of the diagnosis apparatus 10 of the first embodiment when the number of peripheral vehicles 1-2, 1-3 exceeds the threshold.

The diagnosis unit 130 performs the processing of Steps S13 to S15 described above. That is, the diagnosis unit 130 compares the detection value of the host vehicle 1-1 and the appropriate value $\hat{x}$ input from the appropriate value estimation unit 121 for each sensor 30, when the difference between both values exceeds a threshold set in advance (when the detection value of the host vehicle 1-1 deviates from the appropriate value $\hat{x}$), determines that an abnormality occurs in the sensor 30, and when the difference between both values is equal to or less than the threshold (when the detection value of the host vehicle 1-1 does not deviate from the appropriate value $\hat{x}$), determines that an abnormality does not occur in the sensor 30. The diagnosis unit 130 outputs a diagnosis result to the display unit 50 or a speaker inside the vehicle, an external server, or the like.

Figure 7:
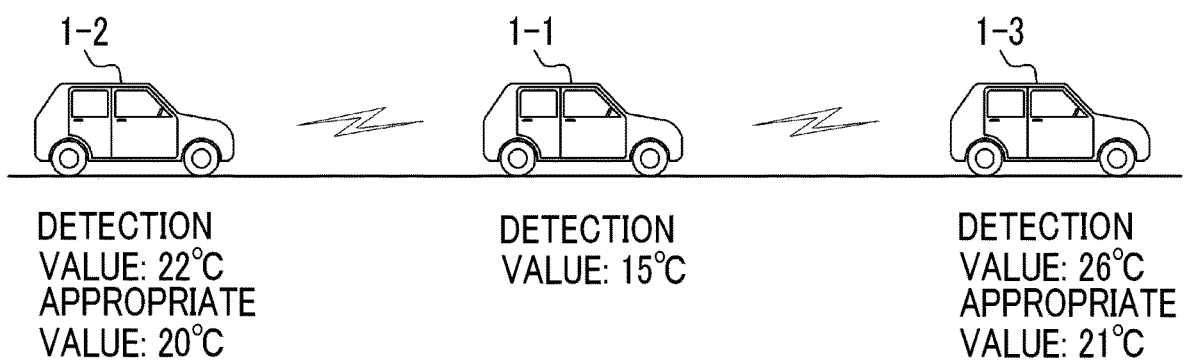
FIG. 7 is a diagram illustrating a diagnosis example of the diagnosis apparatus according to the second embodiment of the present disclosure.

FIG. 7 is a diagram illustrating a specific example of diagnosis of a detection value in the diagnosis apparatus 11. Here, it is assumed that the detection value of the outside air temperature sensor 30 is to be diagnosed, the detection value of the outside air temperature sensor 30 of the host vehicle 1-1 is "15° C.", the detection value of the outside air temperature sensor 30 of the peripheral vehicle 1-2 is "22° C.", the appropriate value of the peripheral vehicle 1-2 is "20° C.", the detection value of the outside air temperature sensor 30 of the peripheral vehicle 1-3 is "26° C.", and the appropriate value of the peripheral vehicle 1-3 is "21° C.". It is assumed that the number of peripheral vehicles "two" is equal to or less than the threshold.

The detection value and appropriate value acquisition unit 150 of the host vehicle 1-1 acquires the detection value "22° C." of the outside air temperature sensor 30 and the appropriate value "20° C." of the peripheral vehicle 1-2 through the vehicle-to-vehicle communication with the peripheral vehicle 1-2, and acquires the detection value "26° C." of the outside air temperature sensor 30 and the appropriate value "21° C." of the peripheral vehicle 1-3 through the vehicle-to-vehicle communication with the peripheral vehicle 1-3.

Based on the index values of the differences between the detection values and the appropriate values of the peripheral vehicles 1-2, 1-3, the appropriate value estimation unit 121 calculates the sensor confidence coefficients higher when the index values are smaller. For example, the sensor confidence coefficient is set to a value obtained by dividing the detection value by the absolute value of the differential value between the detection value and the appropriate value. In this case, the sensor confidence coefficient $s_1$ of the peripheral vehicle 1-2 becomes $22/|22-20|=11$, and the sensor confidence coefficient $s_2$ of the peripheral vehicle 1-3 becomes $26/|26-21|=5.2$.

Next, the appropriate value estimation unit 121 decides the weights according to the sensor confidence coefficients $s_1$, $s_2$. For example, the sensor confidence coefficients $s_1$, $s_2$ are normalized, the weight $w_{s1}$ according to the sensor confidence coefficient $s_1$ is set to 0.68, and the weight $w_{s2}$ according to the sensor confidence coefficient $s_2$ is set to 0.32. When the differential value between the detection value and the appropriate value exceeds a threshold, the confidence coefficient of the detection value is low. For this reason, in order to restrain the use of the detection value in an arithmetic operation of appropriate value estimation, the weight of the sensor confidence coefficient may be set to zero.

Since the outside air temperature sensor 30 is a sensor that is hardly affected by the difference between the vehicles, the appropriate value estimation unit 121 of the host vehicle 1-1 decides the appropriate value of the outside air temperature sensor 30 to $22\times0.68+26\times0.32=23.28$ [° C.] as shown in Expression (2). The diagnosis unit 130 of the host vehicle 1-1 compares the appropriate value "23.28° C." of the outside air temperature sensor 30 with the detection value "15° C." of the outside air temperature sensor 30 of the host vehicle 1-1. Since the difference between both values is "8.28° C.", for example, when the threshold is "5° C.", the diagnosis unit 130 determines that an abnormality occurs in the outside air temperature sensor 30.

In this way, with the diagnosis apparatus 11 according to the second embodiment and the diagnosis method thereof, the detection values of the peripheral vehicles 1-2, 1-3 are acquired, and the appropriate value of the sensor 30 mounted in the host vehicle 1-1 within the predetermined range from the peripheral vehicles 1-2, 1-3 is estimated based on the detection values and the appropriate values of the sensors 30 mounted in the peripheral vehicles 1-2, 1-3. For this reason, according to the second embodiment of the present disclosure, it is possible to perform the diagnosis of the sensor 30 mounted in the host vehicle 1-1 with high accuracy without increasing the amount of communication even though the number of peripheral vehicles 1-2, 1-3 is small.

The confidence coefficients of the sensors 30 are calculated from the detection values and the appropriate values of the sensors 30 mounted in the peripheral vehicles 1-2, 1-3, whereby it is possible to perform diagnosis taking into consideration the influence of the detection value of the sensor 30 in which any abnormality is highly likely to occur, and to suppress degradation of diagnosis accuracy.

The appropriate value of the sensor 30 mounted in the host vehicle 1-1 is estimated taking into consideration the positional information at the time of detection of the sensors 30 mounted in the peripheral vehicles 1-2, 1-3 and at the time of calculation of the appropriate values, whereby it is possible to perform diagnosis while detection information of a peripheral vehicle that is different in traveling direction from the host vehicle 1-1 and is inappropriate for use in diagnosis is excluded.

Third Embodiment

Next, a diagnosis apparatus according to a third embodiment will be described. In the first embodiment and the second embodiment, although an example where the diagnosis apparatus 10 or the diagnosis apparatus 11 (hereinafter, referred to as a "diagnosis apparatus 10 (11)") is mounted in each vehicle 1 has been described, the diagnosis apparatus 10 (11) according to the third embodiment is outside the vehicle 1. That is, in the third embodiment, the host vehicle 1-1 and the peripheral vehicles 1-2, 1-3 are outside the diagnosis apparatus 10 (11).

Figure 8:
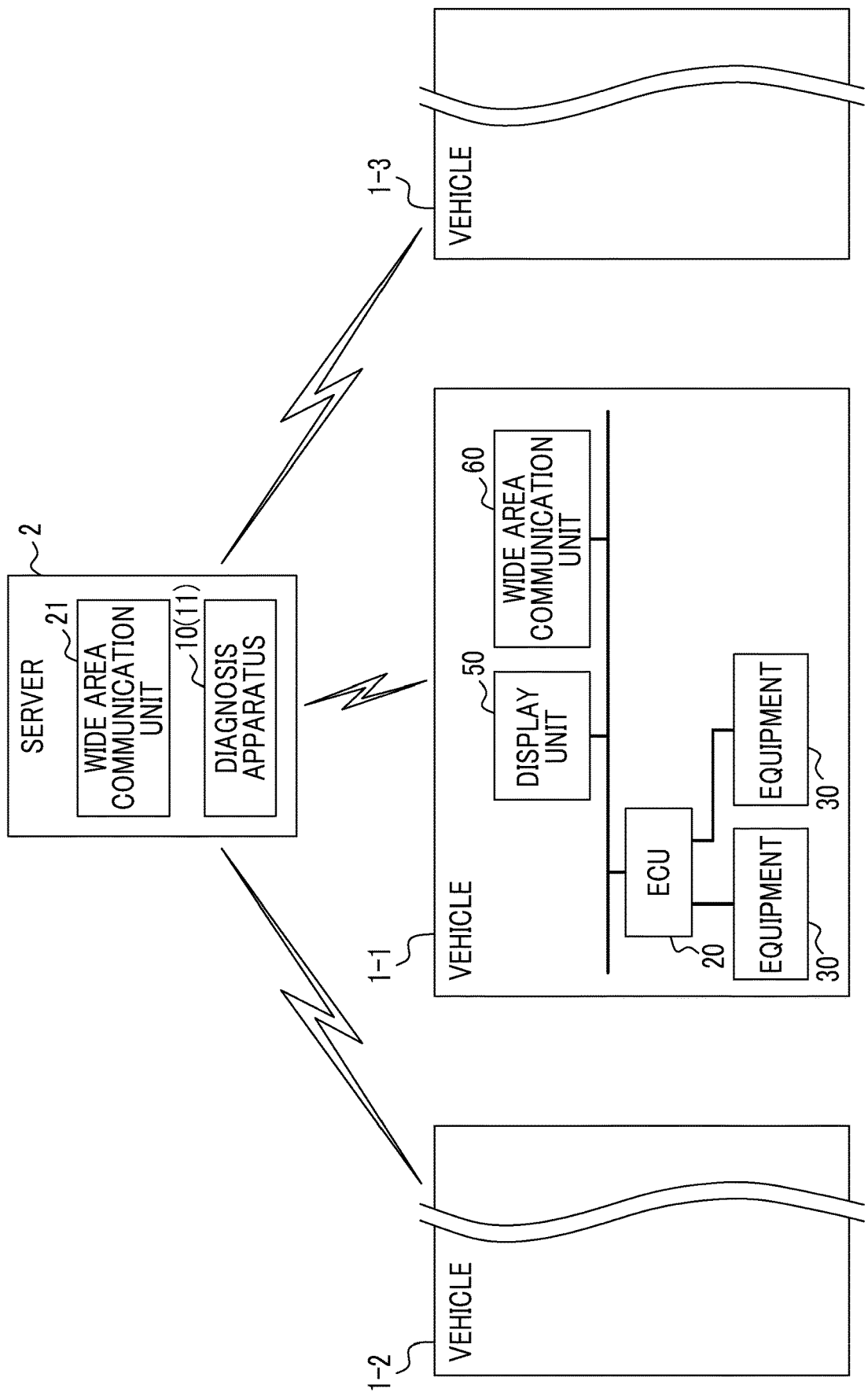
FIG. 8 is a diagram showing the schematic configuration of a system including a diagnosis apparatus according to a third embodiment of the present disclosure.

FIG. 8 is a diagram showing the schematic configuration of a system including the diagnosis apparatus according to the third embodiment. Each vehicle 1 includes the ECU 20, the equipment (in the third embodiment, sensor) 30, the display unit 50, and a wide area communication unit 60. The server 2 includes a wide area communication unit 21 and the diagnosis apparatus 10 (11). The server 2 may be a cloud server or may be a data center.

The wide area communication unit 60 modulates detection information about the sensor 30 mounted in the vehicle 1 using an electric wave in a frequency bandwidth allocated in advance and transmits the modulated detection information to the server 2 through a wide area communication network.

The wide area communication unit 21 receives the detection information about the sensor 30 mounted in each vehicle 1 from each vehicle 1 using an electric wave in a frequency bandwidth allocated in advance through the wide area communication network, demodulates the detection information, and outputs the demodulated detection information to the diagnosis apparatus 10 (11).

A diagnosis method according to the third embodiment is the same as the diagnosis method of the first embodiment or the second embodiment described referring to FIG. 2 or 5. Note that, in the third embodiment, the host vehicle 1-1 means a diagnosis target vehicle, and the peripheral vehicles 1-2, 1-3 mean vehicles within a predetermined range from the diagnosis target vehicle.

When the diagnosis apparatus 10 performs the diagnosis of the sensor 30 mounted in the vehicle 1-1, the detection value acquisition unit 110 acquires the detection values of the diagnosis target vehicle 1-1 and the peripheral vehicles 1-2, 1-3 from the detection information received by the wide area communication unit 21, the appropriate value estimation unit 120 estimates the appropriate value based on the detection values of the peripheral vehicles 1-2, 1-3, and the diagnosis unit 130 compares the detection value and the appropriate value of the diagnosis target vehicle 1-1 to diagnose the operation state of the sensor 30. A diagnosis result may be stored inside the server 2 or may be output to the wide area communication unit 21 and transmitted from the wide area communication unit 21 to the diagnosis target vehicle 1-1.

When the diagnosis apparatus 11 performs the diagnosis of the sensor 30 mounted in the vehicle 1-1, the detection value and appropriate value acquisition unit 150 acquires the detection values of the diagnosis target vehicle 1-1 and the peripheral vehicles 1-2, 1-3 from the detection information received by the wide area communication unit 21, the appropriate value estimation unit 121 estimates the appropriate value based on the detection values of the peripheral vehicles 1-2, 1-3, and the diagnosis unit 130 compares the detection value and the appropriate value of the diagnosis target vehicle 1-1 to diagnose the operation state of the sensor 30. A diagnosis result may be stored inside the server 2 or may be output to the wide area communication unit 21 and transmitted from the wide area communication unit 21 to the diagnosis target vehicle 1-1.

In this way, the diagnosis apparatus 10 (11) according to the third embodiment is disposed in the server 2 outside the vehicle. For this reason, according to the third embodiment of the present disclosure, it is possible to reduce the amount of communication and the calculation load in the vehicle 1. It is also possible to manage a large amount of data of the vehicle 1 inside the server 2 in a batch.

Fourth Embodiment

Next, a diagnosis system according to a fourth embodiment will be described. In the diagnosis system according to the fourth embodiment, in order to allow both of each vehicle 1 and the server 2 to perform the diagnosis of the sensor 30, the diagnosis apparatus 10 (11) is disposed in each vehicle 1 and the server 2.

Figure 9:
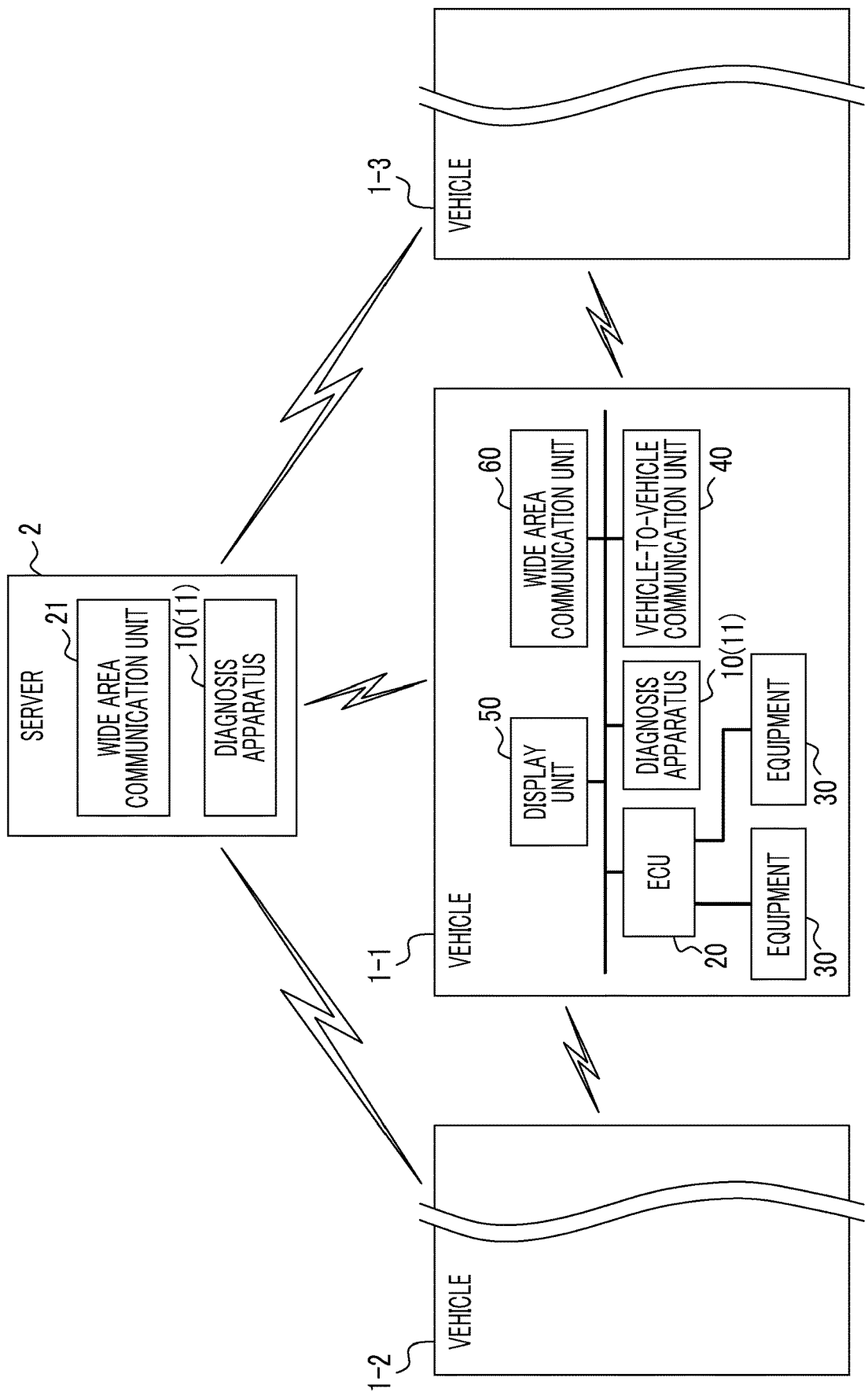
FIG. 9 is a diagram showing the schematic configuration of a diagnosis system according to a fourth embodiment of the present disclosure.

FIG. 9 is a diagram showing the schematic configuration of the diagnosis system according to the fourth embodiment. Each vehicle 1 includes the diagnosis apparatus 10 (11), the ECU 20, the equipment (in the fourth embodiment, the sensor) 30, the vehicle-to-vehicle communication unit 40, the display unit 50, and the wide area communication unit 60. The server 2 includes the wide area communication unit 21 and the diagnosis apparatus 10 (11).

Figure 10:
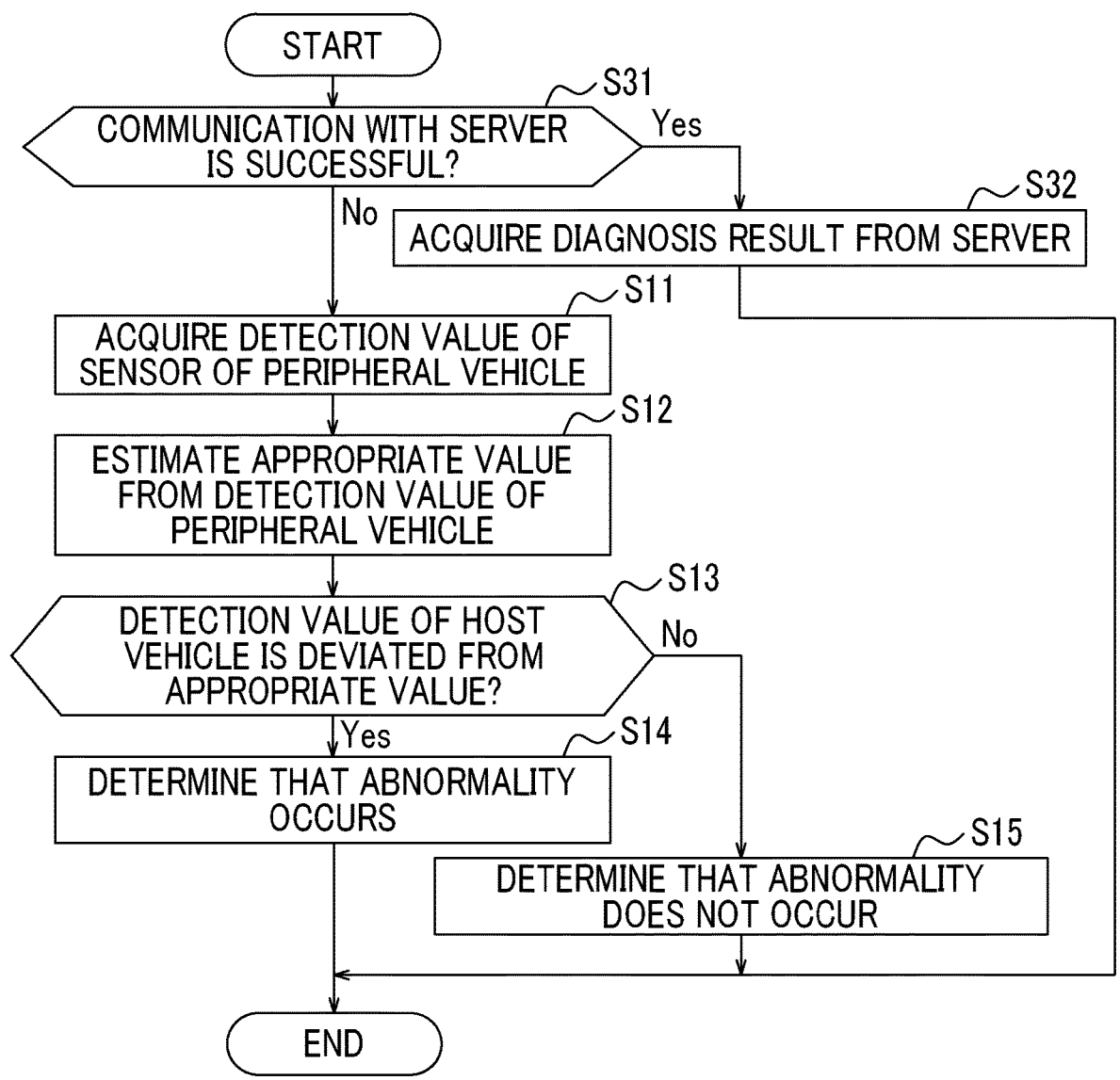
FIG. 10 is a flowchart showing a first example of a procedure of a diagnosis method using the diagnosis system according to the fourth embodiment of the present disclosure.

The processing contents of the diagnosis apparatus 10 mounted in the vehicle 1 will be described referring to FIG. 10. FIG. 10 is a flowchart showing a first example of a procedure of a diagnosis method using the diagnosis system according to the fourth embodiment.

When the wide area communication unit 60 is successful in communication with the server 2 (Step S31—Yes), the diagnosis apparatus 10 on the vehicle 1 side acquires a diagnosis result of the diagnosis apparatus 10 disposed in the server 2 from the server 2 (Step S32).

When the wide area communication unit 60 fails in communication with the server 2 due to a reason, such as electric wave interference or failure of the server 2 (Step S31—No), the vehicle-to-vehicle communication with the peripheral vehicles 1-2, 1-3 is performed, and the detection values of the peripheral vehicles 1-2, 1-3 are acquired from the detection information acquired through the vehicle-to-vehicle communication (Step S11).

A procedure after the detection values are acquired is the same as in the first embodiment, and the diagnosis apparatus 10 estimates the appropriate value (Step S12), compares the detection value of the host vehicle 1-1 with the estimated appropriate value (Step S13), when both values deviate (Step S13—Yes), determines that an abnormality occurs in the sensor 30 mounted in the host vehicle 1-1 (Step S14), and when both values do not deviate (Step S13—No), determines that an abnormality does not occur in the sensor 30 mounted in the host vehicle 1-1 (Step S15).

The detection value acquisition unit 110 of the diagnosis apparatus 10 on the vehicle 1 side performs the processing of Steps S31, S32, and S11 described above. That is, the detection value acquisition unit 110 instructs the wide area communication unit 60 to receive the diagnosis result through communication with the server 2. When the wide area communication unit 60 is successful in communication, the detection value acquisition unit 110 acquires the diagnosis result. When the wide area communication unit 60 fails in communication, the detection value acquisition unit 110 instructs the vehicle-to-vehicle communication unit 40 to receive the detection information of the peripheral vehicles 1-2, 1-3 through the vehicle-to-vehicle communication. Then, the detection value acquisition unit 110 acquires the detection values of the peripheral vehicles 1-2, 1-3 from the detection information received by the vehicle-to-vehicle communication unit 40 and outputs the acquired detection values to the storage unit 140.

The appropriate value estimation unit 120 of the diagnosis apparatus 10 on the vehicle 1 performs the processing of Step S12 described above as in the first embodiment. That is, the appropriate value estimation unit 120 estimates the appropriate value based on the detection values stored in the storage unit 140 and outputs the estimated appropriate value to the diagnosis unit 130.

The diagnosis unit 130 of the diagnosis apparatus 10 on the vehicle 1 performs the processing of Steps S13 to S15 described above as in the first embodiment. That is, the diagnosis unit 130 compares the detection value of the host vehicle 1-1 with the appropriate value input from the appropriate value estimation unit 120 for each sensor 30, when the difference between both values exceeds the threshold set in advance, determines that an abnormality occurs in the sensor 30, and when the difference between both values is equal to or less than the threshold, determines that an abnormality does not occur in the sensor 30. The diagnosis unit 130 may output a diagnosis result to the display unit 50, the speaker, or the like inside the vehicle or may output the diagnosis result to the server 2.

Figure 11:
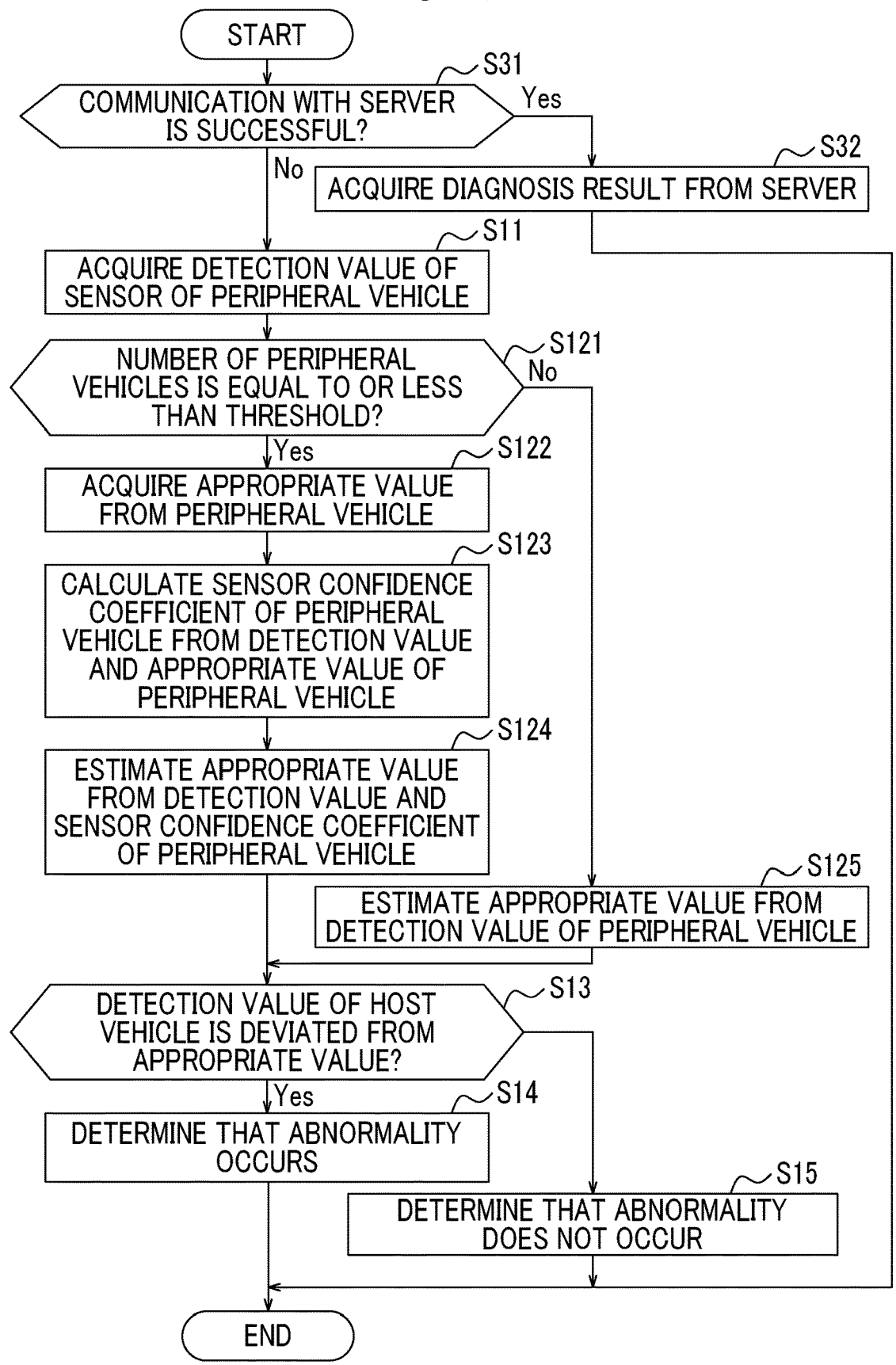
FIG. 11 is a flowchart showing a second example of the procedure of the diagnosis method using the diagnosis system according to the fourth embodiment of the present disclosure.

Next, the processing contents of the diagnosis apparatus 11 mounted in the vehicle 1 will be described referring to FIG. 11. FIG. 11 is a flowchart showing a second example of the procedure of the diagnosis method using the diagnosis system according to the fourth embodiment. The processing other than Steps S121 to S125 is the same as the processing shown in FIG. 10.

The detection value and appropriate value acquisition unit 150 of the diagnosis apparatus 11 on the vehicle 1 performs the processing of Steps S31, S32, and S11. That is, the detection value and appropriate value acquisition unit 150 instructs the wide area communication unit 60 to receive the diagnosis result through communication with the server 2. When the wide area communication unit 60 is successful in communication (Step S31—Yes), the detection value and appropriate value acquisition unit 150 acquires the diagnosis result of the diagnosis apparatus 11 disposed in the server 2 (Step S32). When the wide area communication unit 60 fails in communication (Step S31—No), the detection value and appropriate value acquisition unit 150 instructs the vehicle-to-vehicle communication unit 40 to receive the detection information of the peripheral vehicles 1-2, 1-3 through the vehicle-to-vehicle communication. Then, the detection value and appropriate value acquisition unit 150 acquires the detection values of the peripheral vehicles 1-2, 1-3 from the detection information received by the vehicle-to-vehicle communication unit 40 (Step S11) and outputs the acquired detection values to the storage unit 140.

The appropriate value estimation unit 121 of the diagnosis apparatus 11 on the vehicle 1 performs the processing of Steps S121 to S125 as in the second embodiment. That is, when the number of peripheral vehicles 1-2, 1-3 is equal to or less than the threshold (Step S121—Yes), the appropriate value estimation unit 121 calculates the sensor confidence coefficients of the peripheral vehicles 1-2, 1-3 based on the detection values and the appropriate values of the peripheral vehicles 1-2, 1-3 stored in the storage unit 140 (Step S123), obtains the weights according to the sensor confidence coefficients, and estimates the appropriate value through weighted average (Step S124). When the number of peripheral vehicles 1-2, 1-3 exceeds the threshold (Step S121—No), the appropriate value is estimated from the detection values of the peripheral vehicles 1-2, 1-3 (Step S125).

The diagnosis unit 130 of the diagnosis apparatus 11 on the vehicle 1 performs the processing of Steps S13 to S15 as in the second embodiment. That is, the diagnosis unit 130 compares the detection value of the host vehicle 1-1 with the appropriate value input from the appropriate value estimation unit 120 for each sensor 30, when the difference between both values exceeds the threshold set in advance, determines that an abnormality occurs in the sensor 30, and when the difference of both values is equal to or less than the threshold, determines that an abnormality does not occur in the sensor 30. The diagnosis unit 130 may output a diagnosis result to the display unit 50, the speaker, or the like inside the vehicle or may output the diagnosis result to the server 2.

In this way, in the diagnosis system according to the fourth embodiment, the diagnosis apparatus 10 (11) on the vehicle 1 acquires the detection values of the peripheral vehicles 1-2, 1-3 through the vehicle-to-vehicle communication solely when the vehicle 1 fails in communication with the server 2. For this reason, according to the fourth embodiment of the present disclosure, it is possible to reduce the amount of communication and the calculation load in the vehicle 1, and to manage a large amount of data of the vehicle 1 inside the server 2 in a batch. Even when the vehicle 1 fails in communication with the server 2, the diagnosis of the sensor 30 mounted in the host vehicle 1-1 can be performed by acquiring the detection values of the peripheral vehicles 1-2, 1-3 through the vehicle-to-vehicle communication.

A computer may be used as the above-described diagnosis apparatus 10 (11). Such a computer can be implemented by storing, in a storage unit of the computer, a program in which processing contents for implementing the functions of the diagnosis apparatus 10 (11) are described, and reading and executing the program on a central processing unit (CPU) of the computer.

The program may be recorded in a computer-readable medium. When the computer-readable medium is used, the program can be installed on a computer. Here, the computer-readable medium having the program recorded therein may be a non-transitory recording medium. The non-transitory recording medium is not particularly limited, and may be, for example, a recording medium, such as a compact disc-read only memory (CD-ROM) or a digital versatile disc-read only memory (DVD-ROM).

Although the above-described embodiments have been described as representative examples, it will be apparent to those skilled in the art that various alterations and substitutions may be made within the spirit and scope of the present disclosure. Accordingly, it should be noted that an applicable embodiment of the present disclosure is not limited to the above-described embodiments, and may be modified or altered in various ways without departing from the scope of claims. For example, a plurality of configuration blocks or steps described in the configuration diagrams of the embodiments may be combined into one or one configuration block or step may be divided.

What is claimed is:

1. A diagnosis apparatus comprising:
   a storage that stores instructions; and
   a processor programmed to execute the instructions so as to:
   acquire a detection value of first equipment mounted in a first vehicle and an appropriate value of the detection value of the first equipment;
   compare the detection value of the first equipment with the appropriate value of the detection value of the first equipment to calculate a confidence coefficient of the first equipment;
   estimate an appropriate value of a detection value of second equipment mounted in at least one second vehicle within a predetermined range from the first vehicle based on the confidence coefficient of the first equipment and the detection value of the first equipment; and compare the detection value of the second equipment with the appropriate value of the detection value of the second equipment to perform a diagnosis of an operation state of the second equipment.

2. The diagnosis apparatus according to claim 1, wherein:
the processor is further programmed to acquire positional information at a time of detection of the detection value of the first equipment and at the time of calculation of the appropriate value of the detection value of the first equipment; and
the processor is further programmed to estimate the appropriate value of the detection value of the second equipment based on the detection value of the first equipment, the appropriate value of the detection value of the first equipment, the positional information at the time of detection of the detection value of the first equipment, and the positional information at the time of the calculation of the appropriate value of the detection value of the first equipment.

3. The diagnosis apparatus according to claim 1, wherein the processor is further programmed to, when a number of first vehicles is equal to or less than a threshold, perform the diagnosis.

4. The diagnosis apparatus according to claim 1, wherein the diagnosis apparatus is positioned outside the first vehicle and the second vehicle.

5. A diagnosis system comprising:
a vehicle mounted with a diagnosis apparatus including:
    a storage that stores instructions; and
    a processor programmed to execute the instructions so as to:
        acquire a detection value of first equipment mounted in a first vehicle and an appropriate value of the detection value of the first equipment,
        compare the detection value of the first equipment with the appropriate value of the detection value of the first equipment to calculate a confidence coefficient of the first equipment;
        estimate an appropriate value of a detection value of second equipment mounted in at least one second vehicle within a predetermined range from the first vehicle based on the confidence coefficient of the first equipment and the detection value of the first equipment, and
        compare the detection value of the second equipment with the appropriate value of the detection value of the second equipment to perform a diagnosis of an operation state of the second equipment; and
a server configured to perform communication with the vehicle,
wherein the processor is programmed to acquire the detection value of the first equipment and the appropriate value of the detection value of the first equipment through vehicle-to-vehicle communication solely when the vehicle fails in communication with the server.

6. A diagnosis method comprising:
acquiring a detection value of first equipment mounted in a first vehicle and an appropriate value of the detection value of the first equipment;
comparing the detection value of the first equipment with the appropriate value of the detection value of the first equipment to calculate a confidence coefficient of the first equipment;
estimating an appropriate value of a detection value of second equipment mounted in at least one second vehicle within a predetermined range from the first vehicle based on the confidence coefficient of the first equipment and the detection value of the first equipment; and
comparing the detection value of the second equipment with the appropriate value of the detection value of the second equipment to diagnose an operation state of the second equipment.

* * * * *